(12) United States Patent
Huyghe

(10) Patent No.: US 12,449,278 B2
(45) Date of Patent: Oct. 21, 2025

(54) LIGHTING ARRANGEMENT FOR MONITORING UTILITY FLOW AND METHOD FOR THE SAME

(71) Applicant: Lars Huyghe, Bazel (BE)

(72) Inventor: Lars Huyghe, Bazel (BE)

(73) Assignee: Lars Huyghe, Bazel (BE)

( * ) Notice: Subject to any disclaimer, the term of this patent is extended or adjusted under 35 U.S.C. 154(b) by 65 days.

(21) Appl. No.: 18/493,720

(22) Filed: Oct. 24, 2023

(65) Prior Publication Data

US 2024/0142272 A1  May 2, 2024

Related U.S. Application Data

(60) Provisional application No. 63/381,111, filed on Oct. 26, 2022.

(51) Int. Cl.
| | | |
|---|---|---|
| *G01D 4/02* | (2006.01) | |
| *H02J 3/00* | (2006.01) | |
| *H05B 47/155* | (2020.01) | |
| *H05B 47/165* | (2020.01) | |

(52) U.S. Cl.
CPC ............ *G01D 4/02* (2013.01); *H02J 3/004* (2020.01); *H05B 47/155* (2020.01); *H05B 47/165* (2020.01); *H02J 2300/24* (2020.01); *H04Q 2209/60* (2013.01)

(58) Field of Classification Search
CPC .. H04Q 9/00; H04Q 2209/00; H04Q 2209/10; H04Q 2209/40; H04Q 2209/43; H04Q 2209/60; H04Q 2209/70; H04Q 2209/80; G01D 4/00; G01D 4/002; G01D 4/004; G01D 4/008; G01D 4/02; H05B 47/155; H05B 47/165; H02J 3/004; H02J 2300/24
See application file for complete search history.

(56) References Cited

U.S. PATENT DOCUMENTS

| | | | |
|---|---|---|---|
| 8,325,057 B2 * | 12/2012 | Salter | G01R 21/133 |
| | | | 705/14.66 |
| 10,506,307 B2 * | 12/2019 | Adler | H04Q 9/00 |
| 11,221,249 B2 * | 1/2022 | Gray, Jr. | G01C 13/008 |

(Continued)

FOREIGN PATENT DOCUMENTS

WO   WO-2008025939 A2 *  3/2008 ............... G01D 4/16

OTHER PUBLICATIONS

Flume Smart Home Water Monitor & Leak Detector, Flume Inc., retrieved on Apr. 8, 2025 from https://flumewater.com/product/.

(Continued)

*Primary Examiner* — Franklin D Balseca
(74) *Attorney, Agent, or Firm* — Quinn IP Law

(57) ABSTRACT

Lighting arrangements for monitoring utility flow and methods for monitoring utility flow are provided. In one example, the lighting arrangement includes a smart utility monitoring system that is configured to measure output data from a utility device and process the output data into utility flow data. A controller is configured to retrieve the utility flow data from the smart utility monitoring system. A plurality of lights is in communication with the controller. The controller is configured to direct the plurality of lights to display a light pattern in which at least a portion of the light pattern corresponds to the utility flow data.

9 Claims, 7 Drawing Sheets

(56) References Cited

U.S. PATENT DOCUMENTS

| | | | |
|---|---|---|---|
| 11,532,939 B1* | 12/2022 | Roberts | G06F 3/0416 |
| 12,062,901 B2* | 8/2024 | Rao | G05B 15/02 |
| 2019/0073179 A1* | 3/2019 | Laidlaw | G09G 3/14 |

OTHER PUBLICATIONS

Emporia Home Energy Monitors, Emporia Corp., retrieved on Apr. 8, 2025 from https://emporiaenergy.com/energy-monitors/.

Tekla S. Perry, "Will the Internet of Things Speak a Language of Light?", IEEE Spectrum, Nov. 19, 2015, https://spectrum.ieee.org/will-the-internet-of-things-speak-a-language-of-light.

* cited by examiner

LIGHTING ARRANGEMENT FOR MONITORING UTILITY FLOW AND METHOD FOR THE SAME

CROSS-REFERENCE TO RELATED APPLICATIONS

This application is related to and claims all available benefit of U.S. Provisional Patent Application 63/381,111 filed Oct. 26, 2022, the entire contents of which are herein incorporated by reference.

TECHNICAL FIELD

The present disclosure generally relates to lighting arrangements. More particularly, the present disclosure relates to lighting arrangements for monitoring utility flow and methods for monitoring utility flow using such lighting arrangements.

BACKGROUND

As the effects of global warming have grown and become more apparent, society has become more conscious of resource and utility usage. For example, efforts to limit the burning of fossil fuels and minimize water consumption have been seen across the globe in recent years. Alternative energy sources, such as solar power generation, have been increasingly relied upon to this end. So, too, do individuals have an increasing desire to monitor or limit their personal impact on the environment.

Separate and apart from environmental concerns, individuals additionally have a financial incentive to monitor utility consumption and generation. While most individuals rely on a daily supply of electricity, gas, and/or water, it is not readily discernible how much of these utilities are being used. That is, until a monthly utility bill is posted.

However, if monitoring utility consumption or solar power generation throughout the course of the day was simple, an awareness of the financial impact of consuming additional utilities would follow. Individuals could therefore make informed decisions on whether or not additional utility consumption is desirable. Additionally, it has been shown that an awareness of one's own utility consumption carries with it a general reduction in the total amount of utilities expended by that individual. As such, making utility monitoring as effortless as possible is key to combatting both environmental and financial concerns around utility consumption.

Accordingly, it is desirable to provide an assembly or arrangement for monitoring utility flow that addresses one of more of the foregoing issues, and methods for the same. Furthermore, other desirable features and characteristics of the subject matter disclosed herein will become apparent from the subsequent detailed description and the appended claims, taken in conjunction with the accompanying drawings and this background.

BRIEF SUMMARY

Various non-limiting embodiments of lighting arrangements for monitoring utility flow and methods for monitoring utility flow are provided herein.

In a first non-limiting embodiment, the lighting arrangement includes, but is not limited to, a first smart utility monitoring system that is configured to measure first output data from a first utility device and process the first output data into first utility flow data. The lighting arrangement further includes, but is not limited to, a controller that is configured to retrieve the first utility flow data from the first smart utility monitoring system. The lighting arrangement further includes, but is not limited to, a plurality of lights in communication with the controller. The controller is configured to direct the plurality of lights to display a light pattern in which at least a portion of the light pattern corresponds to the first utility data.

In another non-limiting embodiment, the lighting arrangement includes, but is not limited to, a controller that is configured to retrieve first utility flow data and second utility flow data from a first smart utility monitoring system and a second smart utility monitoring system, respectively. The first and second utility flow data correspond to first output data and second output data measured from a first utility device and a second utility device by the first and second smart utility monitoring systems, respectively. The first and second output data are processed by the first and second smart utility monitoring systems into the first and second utility flow data, respectively. The lighting arrangement further includes, but is not limited to, a plurality of lights in communication with the controller. The controller is configured to direct the plurality of lights to display a light pattern corresponding to the first and second utility flow data.

In another non-limiting embodiment, the method includes, but is not limited to, measuring output data from a utility device. The method further includes, but is not limited to, processing the output data into utility flow data. The method further includes, but is not limited to, retrieving the utility flow data by a controller that is in communication with a plurality of lights. The method further includes, but is not limited to, directing the plurality of lights via the controller to display a light pattern corresponding to the utility flow data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Various embodiments contemplated herein relate to lighting arrangements for monitoring utility flow and methods for monitoring utility flow. The exemplary embodiments taught herein provide a lighting arrangement including a smart utility monitoring system. The smart utility monitoring system measures output data from a utility device and processes the output data into utility flow data. The lighting arrangement further includes a controller that receives the utility flow data from the smart utility monitoring system. A plurality of lights is in communication with the controller to direct the plurality of lights to display a light pattern. At least a portion of the light pattern displayed corresponds to the utility flow data.

In an exemplary embodiment, the lighting arrangement is configured to be disposed in a room, such as a home or apartment living room, hallway or other area within the home or apartment. As such, by advantageously displaying the light pattern that corresponds to the utility flow data in a common area of a home, such as a living room, occupants or other individuals will be readily able to view their utility consumption and generation data, for example in real time, while also adding an aesthetic lighting arrangement to their home décor. As a result, these individuals can make informed decisions about the financial and environmental impacts of their continued utility usage throughout the day and adjust accordingly.

Figure 1:
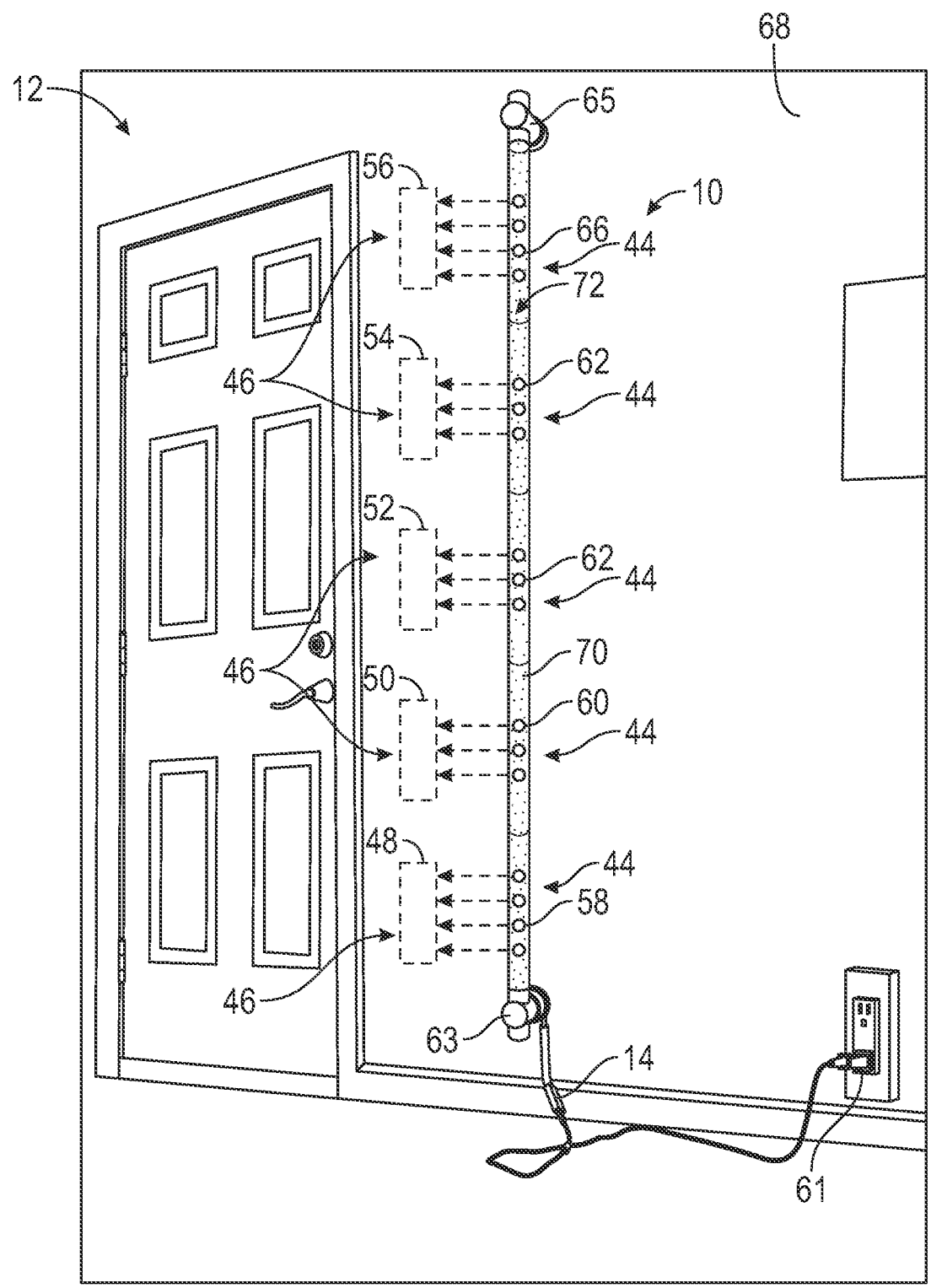
FIG. 1 illustrates a perspective view of a lighting arrangement disposed in a room in accordance with an exemplary embodiment.

Referring to FIG. 1, in accordance with an exemplary embodiment, a lighting arrangement 10 disposed in a room 12 is provided. While the lighting arrangement 10 is depicted as being disposed in a room 12, it is to be understood that the lighting arrangement 10 could be disposed in other areas or locations. Furthermore, various components of the lighting arrangement 10 could be conventionally modified or adjusted for practical or aesthetic purposes or to fit in a desired location, which may have particular or limited packaging space.

The lighting arrangement 10 includes a controller 14. Referring briefly also to FIGS. 2A-2D, the controller 14 is configured to retrieve utility flow data 16, 18, 20, 22, and/or 24 from a smart utility monitoring system(s) 26, 28, 30, and/or 32. As will be discussed in further detail below, the utility flow data 16, 18, 20, 22, and 24 correspond to measurements of utility flow from utility devices 34, 36, 38, 40, and 42, respectively. While the controller 14 is depicted as retrieving utility flow data 16, 18, 20, 22, and/or 24 that correspond to measurements of utility flow from utility devices 34, 36, 38, 40, and/or 42, it is to be understood that the controller 14 could be configured to retrieve any number of utility flow data that correspond to measurements of utility flow from any number of utility devices.

Referring back to FIG. 1, the lighting arrangement 10 further includes a plurality of lights 44 in communication with the controller 14. The plurality of lights is, for example, a light-emitting diode (LED) strip or a plurality or series of LEDs. In an exemplary embodiment, the plurality of lights 44 includes individually controllable lights that are each independently in communication with the controller 14 and are each independently configured to produce light. The plurality of lights 44 may be configured to produce various colors and/or intensities of light, individually or in combination.

The controller 14 is configured to direct the plurality of lights 44 to display a light pattern 46. At least a portion of the light pattern 46 corresponds to utility flow data 16, 18, 20, 22, and/or 24. For example, the light pattern 46 or a portion thereof may represent a total water, electric, gas, and/or other utility use over a period of time, for example over a relatively short duration or time or over a relatively long duration of time. Alternatively, the light pattern 46 or a portion thereof may represent a total cost of utility use over a period of time, for example over a relatively short duration or time or over a relatively long duration of time. Various alternate embodiments include the light pattern 46 or a portion thereof representing battery capacity, solar power generation, or battery storage over a period of time. In some embodiments, the lighting arrangement 10 estimates average daily consumption or generation of individual utilities and the light pattern 46 or a portion thereof represents current day utility consumption or generation in comparison to the estimated average. In any case, the light pattern 46 visually represents data relating to utility use measured from at least one utility device.

The light pattern 46 may include light pattern portions 48, 50, 52, 54, and/or 56 that correspond to sections of lights 58, 60, 62, 64, and/or 66 of the plurality of lights 44. In an exemplary embodiment, the light pattern portions 48, 50, 52, 54, and/or 56 correspond to one or more utility flow data 16, 18, 20, 22, and/or 24, respectively. For example, if the controller 14 is configured to retrieve only utility flow data 16 and 18, the light pattern 46 may include corresponding light pattern portions 48 and 50 that correspond to sections of lights 58 and 60 of the plurality of lights 44. In this example, the controller 14 would be configured to direct the section of lights 58 to display the light pattern portion 48 corresponding to utility flow data 16 and to direct the section of lights 54 to display the light pattern portion 60 corresponding to utility flow data 18. Notwithstanding, because, as discussed above, the controller 14 may be configured to retrieve any number (e.g., one or more) of utility flow data, it is to be understood that the controller 14 may direct any number (e.g., one or more) of sections of lights of the plurality of lights 44 to display any number (e.g., one or more) of light pattern portions to form the light pattern 46.

Each of the corresponding light pattern portions 48, 50, 52, 54, and/or 56 may be a different color, intensity, or shade to differentiate the light pattern portions 48, 50, 52, 54, and/or 56 to an onlooking user or observer. For example, water use may be represented by blue light in light pattern portion 48 while electric oven and electric lighting use may be represented by differing shades of green in light pattern portions 52 and 54, respectively.

The light pattern 46, and/or the light pattern portion(s) 48, 50, 52, 54, and/or 56, may vary in intensity, color, or shade over time. For example, when utility flow data 16 indicates utility flow (e.g., water in current or real-time use), the light intensity of the corresponding light pattern portion 48 may vary dynamically over time at a variation speed. In an exemplary embodiment, the variation speed corresponds to amount of utility flow. For example, the variation speed may be faster when utility flow data 16 indicates a higher utility flow and slower when utility flow data 16 indicates a lower utility flow.

The lighting arrangement 10 may further include an application (e.g., app or program) that is operative to allow a user to modify settings and/or display of the light pattern 46. For example, the application may provide the user with the ability to modify the color, intensity, or shade of the light pattern 46 and/or the light pattern portions 48, 50, 52, 54, and/or 56. The application may also allow the user to select various modes for the lighting arrangement 10. For example, the application may be operative to allow the user to utilize the lighting arrangement 10 as a standard lighting arrangement in general lighting mode or to turn off the lighting arrangement 10 and corresponding light pattern 46 in off mode. The application may also allow the user to preset a designated mode(s) for the lighting arrangement 10 at particular time(s) or period(s) of time. For example, the application may allow the user to preset the lighting arrangement 10 to operate in utility display mode between 8:00 AM and 10:00 PM, operate in general lighting mode between 6:00 AM-7:59 AM, and be in off mode between 10:01 PM and 5:59 AM. The application may also include modes such as weather mode, alarm mode, music mode, or otherwise that the user can switch between through operation of or selection in the application.

In an exemplary embodiment, the lighting arrangement 10 integrates with other smart home devices. Additionally, the lighting arrangement 10 may include voice control functionality that allows a user to communicate with and direct the lighting arrangement 10 to perform various functions through the controller 14. These various functions include, for example, changing the mode of the lighting arrangement 10, change the intensity of the light pattern 46 displayed, or the like. Integration with other smart home devices may allow the lighting arrangement to be operated through those other smart home devices. For example, when the lighting arrangement 10 is integrated with another smart home device that includes voice control, the lighting arrangement may be operative to perform various functions through direction from the other smart home device that communicates with the controller 14.

In an exemplary embodiment, the lighting arrangement 10 is coupled to a power supply 61. As depicted, the power supply 61 is an electric outlet in a room 12. However, it is to be understood that the lighting arrangement 10 could alternatively be powered by an internal power supply or otherwise. The power supply 61 supplies power to the controller 14 and the plurality of lights 44.

The general structure of the lighting arrangement 10 may take many forms. As depicted in FIG. 1, the lighting arrangement 10 includes brackets 63, 65 that couple the lighting arrangement 10 to a wall 68 of the room 12. In an exemplary embodiment, the controller 14 is coupled to, housed by, disposed in, and/or covered by one of the brackets 63, or 65.

The lighting arrangement 10 may include a rod 70 that is disposed between and coupled to the brackets 64, 66. In an exemplary embodiment, the rod 70 allows light to pass therethrough. For example, the rod 70 may be transparent or translucent. Cavities 72 may be formed in the rod 70 for aesthetic appearance purposes. However, it is to be understood that the rod 70 may also be hollow or completely solid.

The plurality of lights 44 may be coupled to, housed and/or supported by, disposed in, disposed on, or surrounded by the rod 70. For example, the plurality of lights 44 may be an LED strip that is coupled to the rod 70 by an adhesive. Alternate methods of coupling may include fastening, mounting, or the like.

In an exemplary embodiment, the lighting arrangement 10 may also include a push button or a corresponding remote-control device that allows a user to turn the lighting arrangement on or off. With respect to embodiments including a push button, the push button may also have dial functionality that allows the user to modify the intensity of the light displayed in the light pattern 46.

Figure 2A:
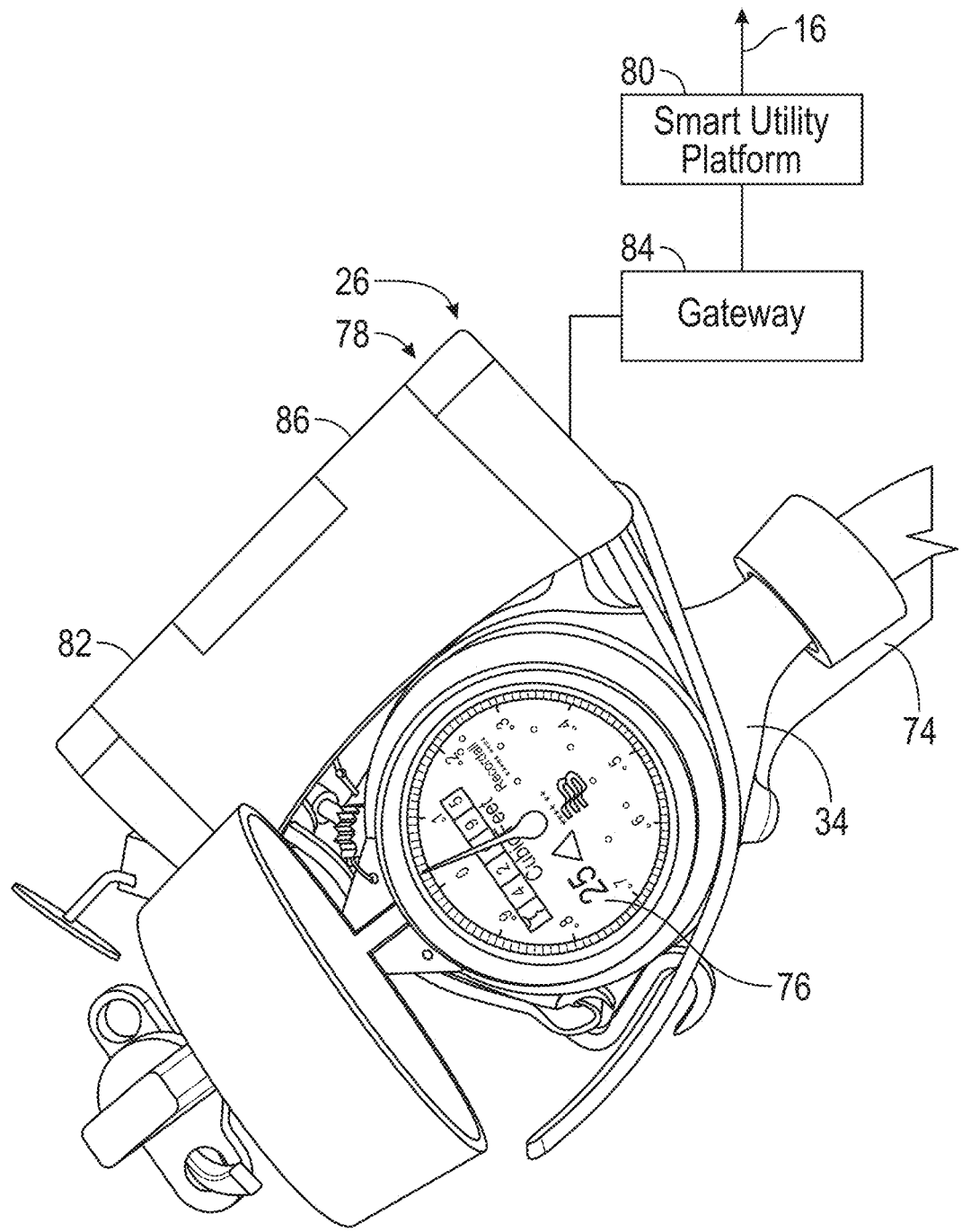
FIG. 2A illustrates a perspective top view of a smart utility monitoring system coupled to a water flow device in accordance with an exemplary embodiment.

Referring to FIG. 2A, a smart utility monitoring system 26 coupled to a utility device 34 is provided. As used herein, the term "utility device" describes any device or apparatus that either supplies or generates a utility service or directly interfaces with a device or apparatus that supplies or generates a utility service. Utility services include, for example, water, electricity, gas, solar power, battery storage, and the like. Examples of utility devices in accordance with the present disclosure include water meters, main water valves, electric meters, electric panel circuits (e.g., circuit breakers on a breaker panel), solar panels, electric car chargers, and gas meters.

The utility device 34 is configured to communicate output data. In an exemplary embodiment, the output data corresponds to a measurement of utility flow in the utility service flowing through or interfacing with the utility device 34. For example, the output data may correspond to a measurement of solar power generation, water flow, electricity use, electric car charging, battery power generation or storage, gas flow, heating, air conditioning, water tank capacity, gas tank capacity, or the like.

As depicted in FIG. 2A and in accordance with an exemplary embodiment, the utility device 34 is a water meter coupled to a water supply (e.g., main water valve) by one or more pipes 74. Conventional water meters come in many forms that may utilize various techniques or principles to measure water flow. In any case, water meters are designed to measure the flow of water and communicate that measurement as output data. For example, utility device 34 may include a display panel 76 that visually displays the volume of water flow through the pipe(s) 74. Additionally, or alternatively, utility device 34 may produce a magnetic field that indicates the volume of water flow through the pipe(s) 74. In this example, the utility device 34 may include an internal magnet that rotates as water flows through the pipes 74, thereby creating a pulsating magnetic field as output data.

The smart utility monitoring system 26 is configured to measure the output data from the utility device 34 and process the output data into utility flow data 16. For example, the smart utility monitoring system 26 includes a smart utility monitoring device 78 that measures the output data from the utility device 34 and a smart utility platform 80 that processes the output data into utility flow data 16.

In an exemplary embodiment, the smart utility monitoring device 78 includes a measuring device 82 that measures the output data from the utility device 34 and a gateway 84 that receives the output data from the measuring device 82 and uploads the output data to the smart utility platform 80 via a network. As used herein, the term "measure output data" includes receiving, reading, sensing, detecting, or measuring the output data communicated from the utility device 34. The structure of the measuring device may vary depending on the form of the output data produced by the corresponding utility device. However, as depicted, the measuring device 82 is a magnetometer that measures the pulse frequency of the magnetic field produced by the utility device 34. Alternate measuring devices may include cameras or visual sensors that read the output data from the display panel 76 of the utility device, for example.

In an exemplary embodiment, the measuring device 82 communicates the output data to the gateway 84 via a transmitter 86. As such, the gateway 84 may be configured to receive the output data from the transmitter 86. However, it is to be understood that various embodiments of the smart utility monitoring device 78 include smart utility monitoring devices that do not include a transmitter 86. In such cases, the gateway 84 may receive the output data directly from the measuring device 82. As depicted, the transmitter 86 is a part of the measuring device 82. However, it is to be understood that the transmitter 86 may also form a part of the lighting arrangement 10 separate and apart from the measuring device 82. In some embodiments, a transmitter 86 is utilized when the gateway 84 is located a distance away from the measuring device 82. For example, where the utility device 34 is a water meter located outside the range of the network in the home, a transmitter 82 may be used to transmit the output data to the gateway 84 inside the range of the network. In an exemplary embodiment, the transmitter 86 communicates the output data to the gateway 84 as a radiofrequency signal.

The gateway 84 is connected to a network to upload the output data to the smart utility platform 80 via the network. As used herein, the term "network" describes any network or combination of networks of devices that communicate with one another. For example, the network can be any one or any combination of local area network (LAN), home area network (HAN), wide area network (WAN), telephone network, wireless network, Bluetooth network, point-to-point network, star network, token ring network, hub network, or other appropriate configuration. In an exemplary embodiment, the gateway is connected to a wireless network and uploads the output data to the smart utility platform 80 via wi-fi.

For water meters, smart utility monitoring devices such as those just described, including a measuring device, transmitter, and gateway, are commercially available from Flume® and sold under the name Flume® Smart Home Water Monitor. Flume® is headquartered in San Luis Obispo, California.

The smart utility platform 80 is configured to receive the output data from the gateway 84 and process the output data into utility flow data 16. In an exemplary embodiment, the smart utility platform 80 may include a program or algorithm that processes the output data into utility flow data 16. For example, the smart utility platform 80 may process data corresponding to pulse frequency of the magnetic field produced by the utility device 34 into water flow rate data as the utility flow data 16. Such data processing can be accomplished through, for example, arithmetic (e.g., numerical manipulation) or conversion and may depend on the content and form of the output data. In an exemplary embodiment, the smart utility platform 80 is an online platform. For example, the smart utility platform 80 may be a mobile phone application, tablet or computer application, or website that can be connected to via wi-fi.

The controller 14 is configured to communicate with the smart utility platform 80 to retrieve the utility flow data 16. For example, the controller 14 is connected to the network to communicate with the smart utility platform 80. In an exemplary embodiment, the controller 14 may be connected to wi-fi and/or Bluetooth. Retrieval of the utility flow data 16 from the smart utility platform 80 may be accomplished in many ways and depends upon the security or firewalls of the network connected to the smart utility platform 80. For example, the controller 14 may retrieve the utility flow data 16 by providing an application programming interface ("API") key or REST API to the smart utility platform 80. In any case, the controller 14 may be configured to provide necessary input information to the smart utility platform 80 in order to retrieve the utility flow data 16 from the smart utility platform 80.

Figure 2B:
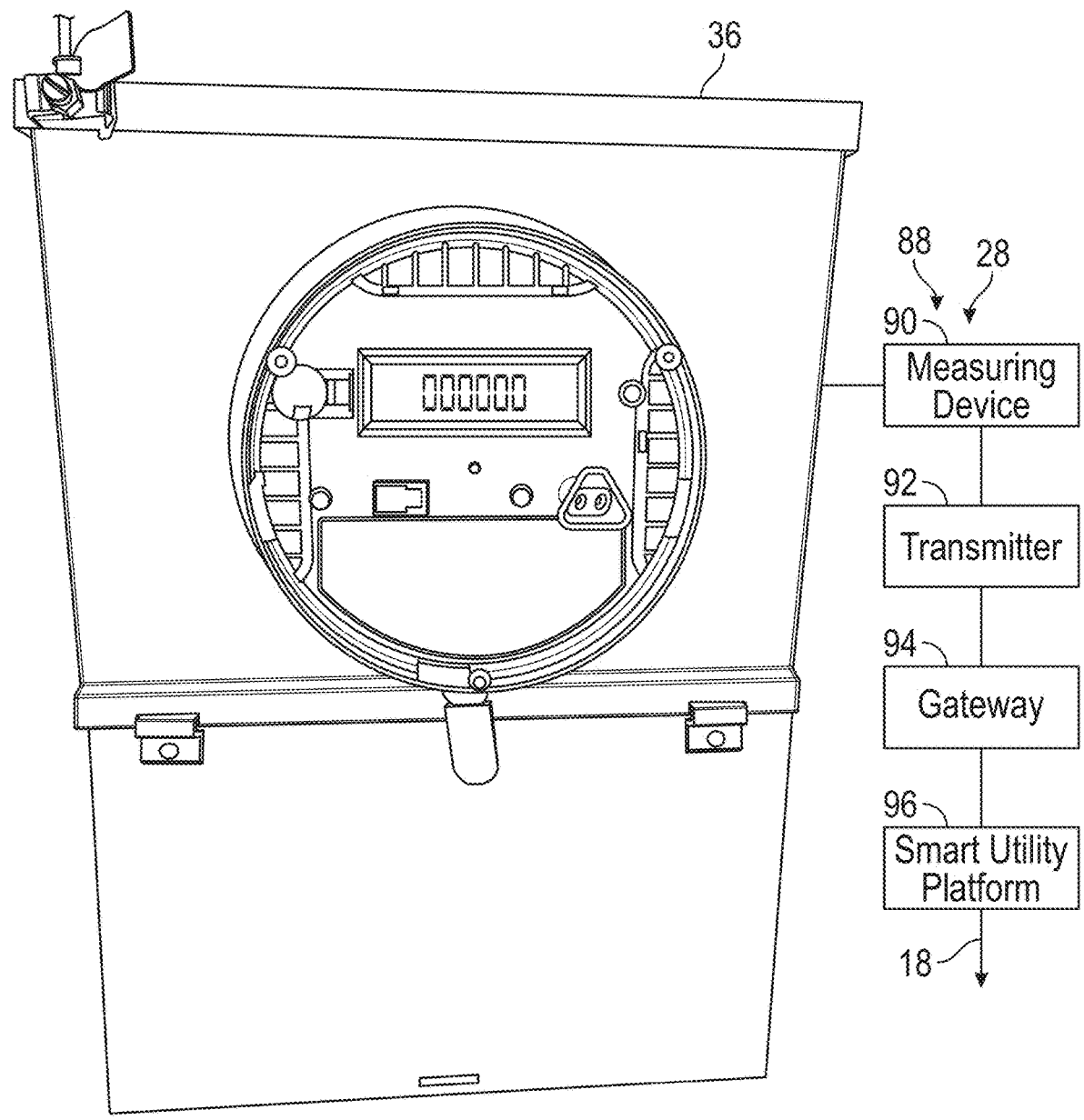
FIG. 2B illustrates a perspective front view of a smart utility monitoring system coupled to an electric flow device in accordance with an exemplary embodiment.

Referring to FIG. 2B, a smart utility monitoring system 28 coupled to a utility device 36 is provided. The smart utility monitoring system 28 is similarly configured as the smart utility monitoring system 26, including both a smart utility monitoring device 88 that includes a measuring device 90, an optional transmitter 92, and a gateway 94 and a smart utility platform 96. In an exemplary embodiment, the gateway 94 and the smart utility platform 96 may be shared between the smart utility monitoring systems 26 and 28. For example, gateway 94 may reference the same gateway as gateway 84. Alternatively, gateway 94 may reference a gateway separate and apart from gateway 84. Additionally, the measuring device 90 may be configured differently than the measuring device 82 to the extent that the utility device 36 is different from utility device 34.

As depicted in FIG. 2B and in accordance with an exemplary embodiment, the utility device 36 is an electric meter coupled to at least one electric circuit. The utility device 36 may communicate output data corresponding to total electricity use, for example, a structure or dwelling, home, condo, apartment or the like. For example, utility device 36 may output a radiofrequency signal as output data that indicates the amount of electricity communicated through the circuits coupled to the utility device 36.

As mentioned above, the measuring device 90 may be configured differently than the measuring device 82. For example, if the utility device 36 is an electric meter that outputs a radiofrequency signal as the output data, while the measuring device 90 may be a radiofrequency detector that measures the radiofrequency signal and either directly communicates the signal to the gateway 94 or communicates the signal to the gateway 94 via a transmitter 92. In an exemplary embodiment, the gateway 94 uploads the output data to the smart utility platform 96 that processes the output data into utility flow data 18, which is then retrieved by the controller 14.

For electric meters, smart utility monitoring devices such as those just described, including a measuring device and gateway, are commercially available from Emporia® and sold under the name Emporia® Wireless Energy Monitor. Emporia® is headquartered in Littleton, Colorado.

Figure 2C:
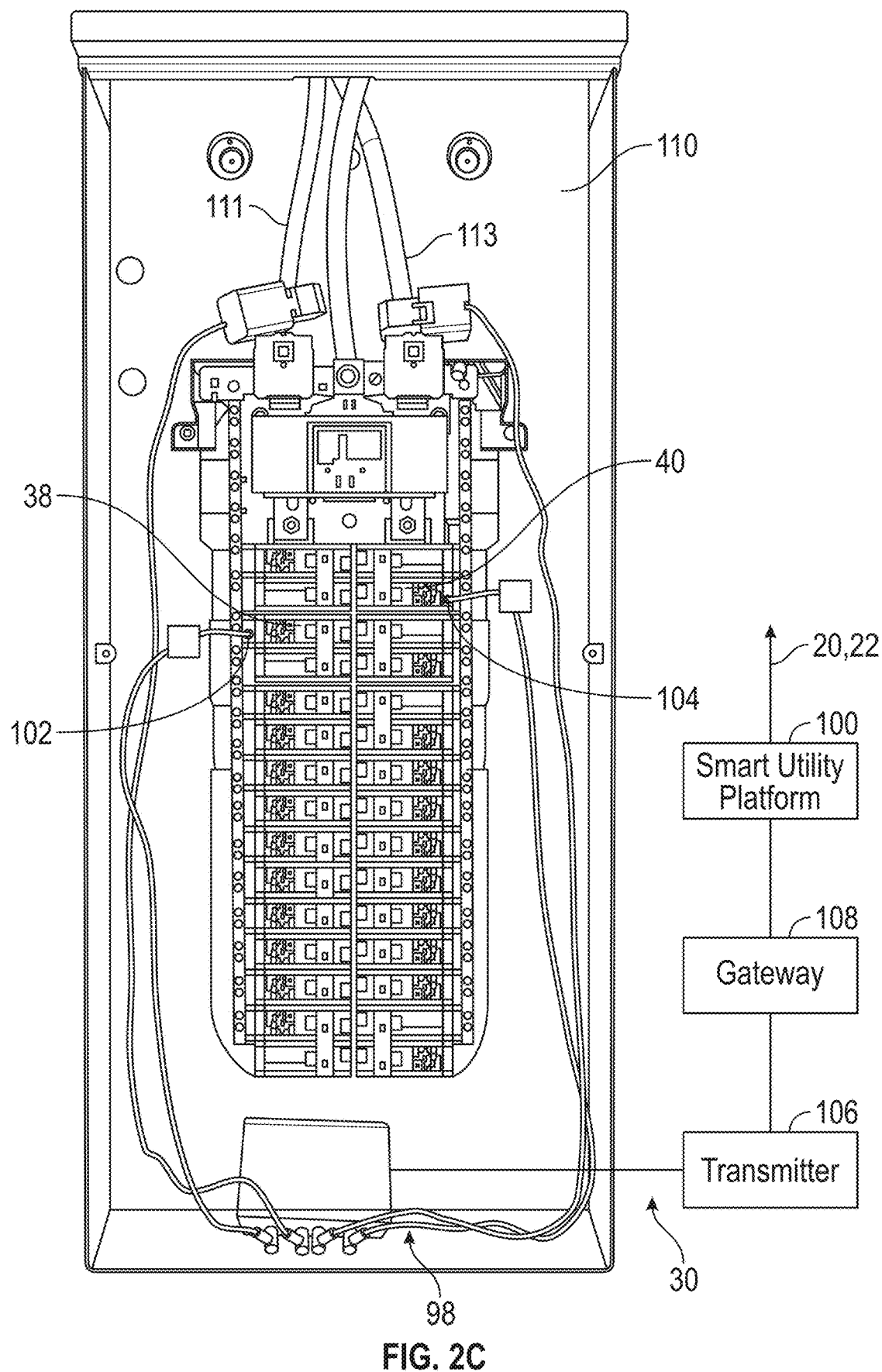
FIG. 2C illustrates a perspective front view of a smart utility monitoring system coupled to electric flow devices in accordance with an exemplary embodiment.

Referring to FIG. 2C, a smart utility monitoring system 30 coupled to utility devices 38 and 40 is provided. The smart utility monitoring system 30 is similarly configured as the smart utility monitoring systems 26 and 28, including both a smart utility monitoring device 98 and a smart utility platform 100. However, the smart utility monitoring device 98 includes two measuring devices 102 and 104 that measure output data from the two utility devices 38 and 40, respectively. Again, the measuring devices 102 and 104 may be configured differently than the measuring devices 82 and 90 to the extent that the utility devices 38 and 40 are different from utility devices 34 and 36. Otherwise, the smart utility monitoring device 98 is similarly configured to the smart utility monitoring devices 78 and 88, including an optional transmitter 106 and a gateway 108. As is the case with all the smart utility monitoring systems of the present disclosure, the gateways and smart utility platforms may be shared between the smart utility monitoring systems or may be separate gateways and smart utility platforms.

As illustrated in FIG. 2C, in accordance with an exemplary embodiment, the utility devices 38 and 40 are electric panel circuits in a breaker panel 110. However, it is to be understood that breaker panel 110 includes various other utility devices that could be monitored for utility flow, including main feed lines 111 or 113 of the breaker panel 110. The utility devices 38 and 40 may communicate output data corresponding to electricity use for a particular electric circuit in the breaker panel 110, for example, a structure or dwelling, home, condo, apartment or the like. For example, utility devices 38 and 40 may output currents and/or voltages that flow through the electric panel circuits.

Because current output from electric panel circuits in a breaker panel 110 may be relatively high, in such cases the measuring devices 102 and 104 may include a current transformer in communication with the utility devices 38 and 40 to produce a current that is lower than and substantially proportional to the current output by the utility devices 38 and 40. The measuring devices 102 and 104 may further include an ammeter in communication with the current transformer to measure the stepped-down current. The measuring devices 102 and 104, the optional transmitter 106, and the gateway 108 function as discussed above to upload the output data to the smart utility platform 100 that processes the output data into utility flow data 20 and 22 that correspond to output data from the utility devices 38 and 40, respectively. The controller 14 then retrieves utility flow data 20 and 22 from the smart utility platform 100.

For breaker panels, smart utility monitoring devices such as those just described, including measuring devices and a gateway, are commercially available from Emporia® and sold under the name Emporia® VUE Energy Monitor. Emporia® is headquartered in Littleton, Colorado.

Figure 2D:
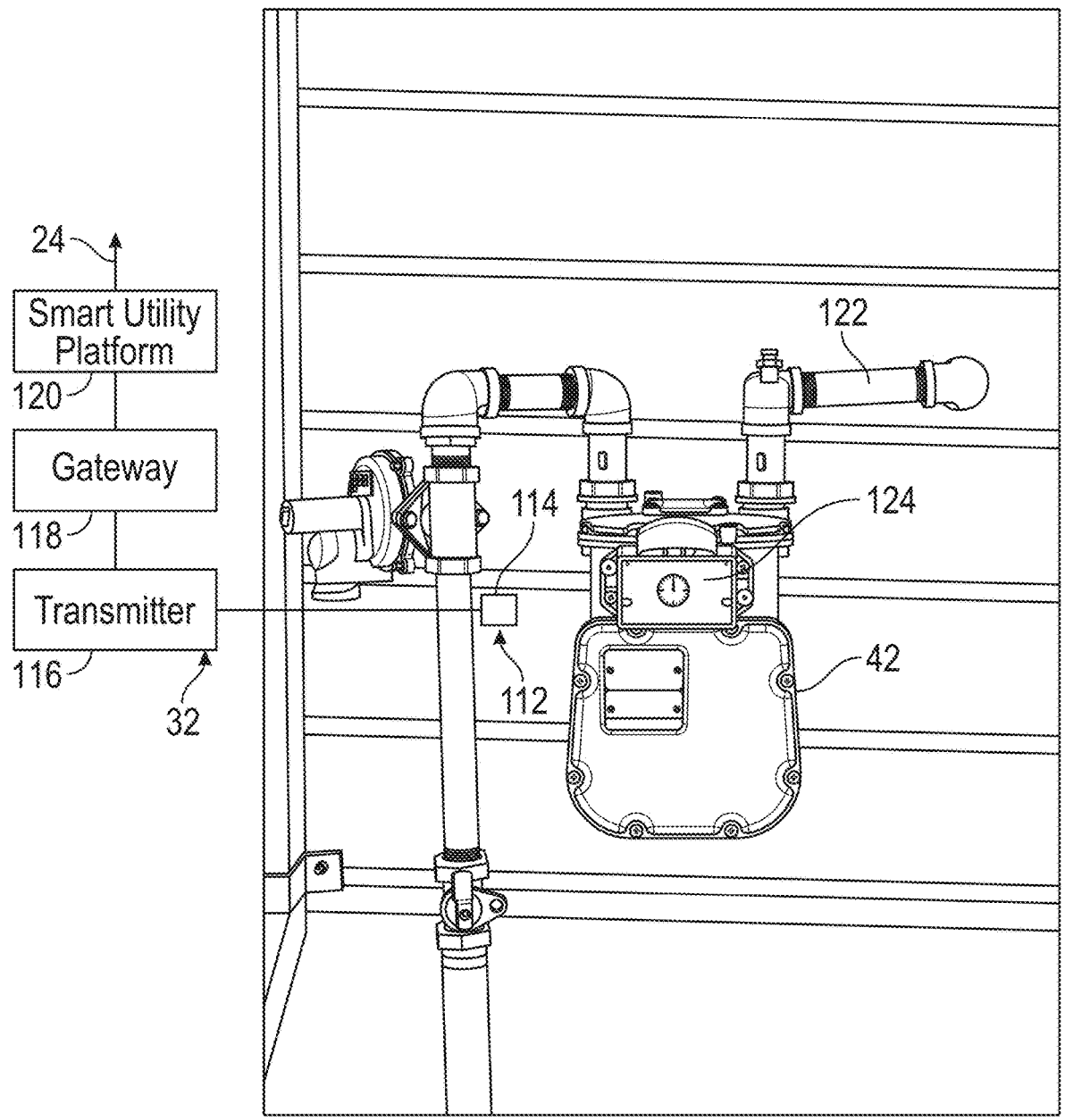
FIG. 2D illustrates a perspective front view of a smart utility monitoring system coupled to a gas flow device in accordance with an exemplary embodiment.

Referring to FIG. 2D, in an exemplary embodiment, a smart utility monitoring system 32 coupled to a utility device 42 is provided. The smart utility monitoring system 32 is similarly configured as the smart utility monitoring systems 26 and 28, including both a smart utility monitoring device 112 that includes a measuring device 114, an optional transmitter 116, and a gateway 118 and a smart utility platform 120. Again, the measuring device 114 may be configured differently than the other previously discussed measuring devices (or the same), depending on the form of the output data communicated by the utility device 42. Likewise, the gateway 118 and the smart utility platform 120 may be the same gateway or platform utilized in the other smart utility monitoring systems disclosed herein or may be separate and independent gateways or platforms specific to smart utility monitoring system 32.

As illustrated in FIG. 2D, in accordance with an exemplary embodiment, the utility device 42 is a gas meter coupled to a gas supply through pipes 122. Gas meters generally include internal rotating magnets that produce a pulsating magnetic field, much like the pulsating magnetic field of the water meter discussed in the preceding sections. However, as depicted, the utility device 42 communicates the output data on a display panel 124 of the utility device 42 that visually displays a volume of gas flowing through the pipe(s) 122.

The measuring device 114 may be a camera or visual sensor that reads the output data from the display panel 124 of the utility device 42. However, it is to be understood that the measuring device may be a magnetometer when, for example, the utility device 42 generates a pulsating magnetic field as output data. The measuring device 114, the optional transmitter 116, and the gateway 118 function as discussed above to upload the output data to the smart utility platform 120 that processes the output data into utility flow data 24 that corresponds to output data from the utility device 42. The controller 14 then retrieves utility flow data 24 from the smart utility platform 120.

Figure 3:
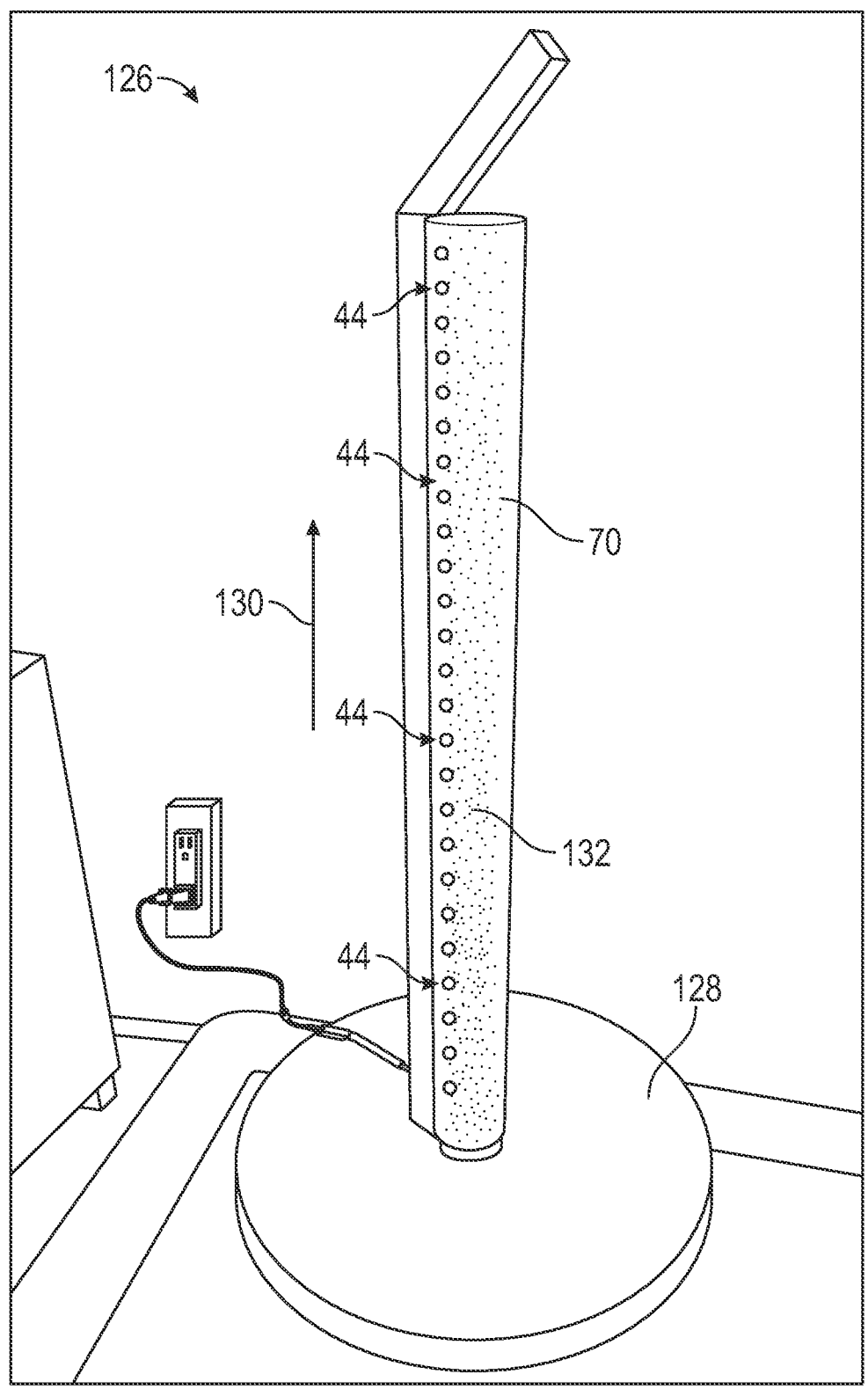
FIG. 3 illustrates a perspective front view of a lighting arrangement in accordance with an exemplary embodiment.

Referring to FIG. 3, an alternate embodiment of a lighting arrangement 126 is provided. The lighting arrangement 126 is configured as the lighting arrangement 10, except that the lighting arrangement 126 does not include brackets. Instead, the lighting arrangement 126 includes a base portion 128 that extends in a longitudinal direction 130 and a body portion 132 that extends from the base portion 128 in the longitudinal direction 130. The body portion 132 may include the plurality of lights 44. For example, the lighting arrangement may include a rod 70 to form at least a part of the body portion 132 and the plurality of lights 44 may be coupled to, housed and/or supported by, disposed in, disposed on, or surrounded by the rod 70.

Figure 4:
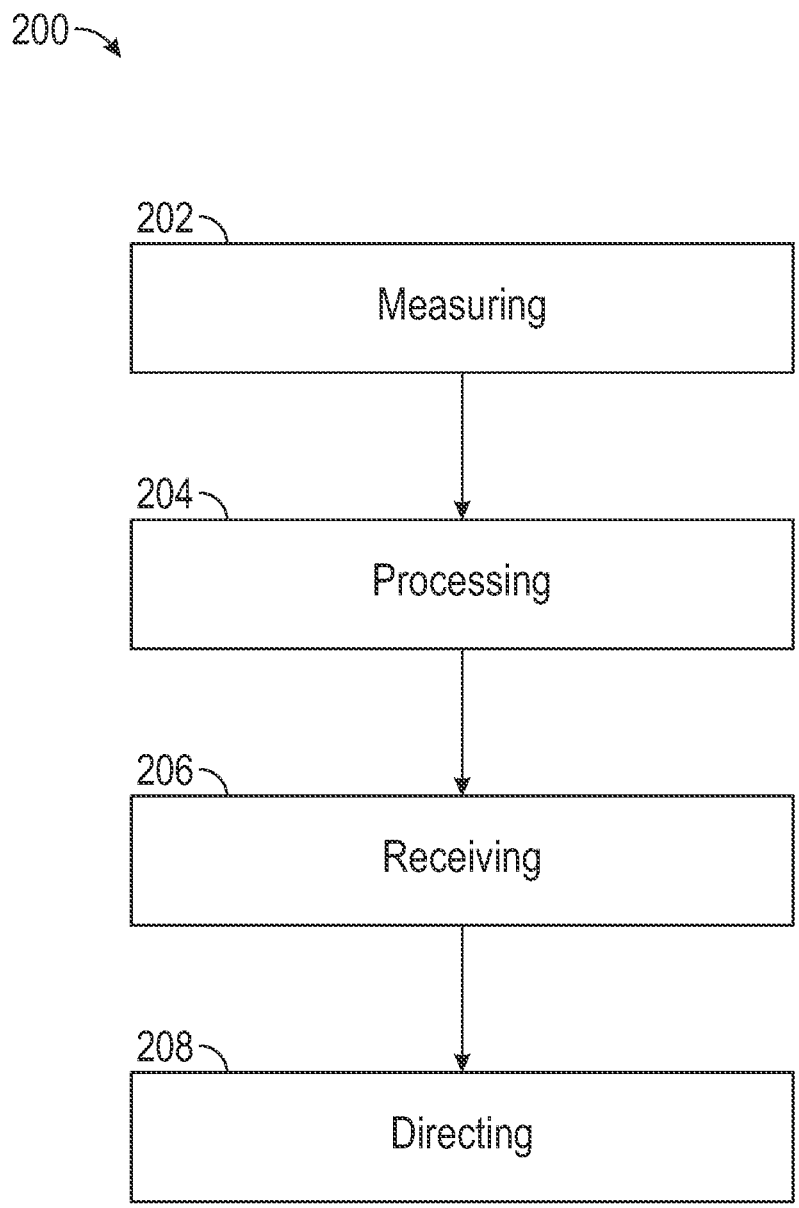
FIG. 4 illustrates a flow diagram for a method for monitoring utility flow in accordance with an exemplary embodiment.

Referring to FIG. 4, a method 200 for monitoring utility flow in accordance with an exemplary embodiment is provided. The method 200 includes measuring (STEP 202) output data from a utility device. The output data is processed (STEP 204) into utility flow data. The utility flow data is retrieved (STEP 206) by a controller that is in communication with a plurality of lights. For example, retrieving the utility flow data may include providing an application programming interface key from the controller to a smart utility platform. The plurality of lights is directed (STEP 208) via the controller to display a light pattern corresponding to the utility flow data.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A lighting arrangement for monitoring utility flow, the lighting arrangement comprising:
   a controller that is configured to retrieve first utility flow data and second utility flow data from a first smart utility monitoring system and a second smart utility monitoring system, respectively, wherein the first and second utility flow data correspond to first output data and second output data measured from a first utility device and a second utility device by the first and second smart utility monitoring systems, respectively, wherein the first utility device supplies or generates a first utility service, wherein the second utility device supplies or generates a second utility service different than the first utility service, and wherein the first and second output data are processed by the first and second smart utility monitoring systems into the first and second utility flow data, respectively; and
   a plurality of lights in communication with the controller, wherein the controller is configured to direct the plurality of lights to display a light pattern corresponding to the first and second utility flow data;

wherein the lighting arrangement is operable in a general lighting mode in which the plurality of lights are on and the light pattern is not displayed, in a utility display mode in which the light pattern is displayed, and in an off mode in which the plurality of lights are off; and wherein the lighting arrangement further comprises an application that is operative to allow a user to alternately select each of the general lighting mode, the utility display mode, and the off mode.

2. The lighting arrangement of claim 1, wherein the lighting arrangement further comprises:
a base portion that extends in a longitudinal direction; and
a body portion configured as an elongated rod that extends from the base portion in the longitudinal direction, and wherein the plurality of lights are arranged as a vertical array along the elongated rod.

3. The lighting arrangement of claim 1, wherein the light pattern comprises a first light pattern portion and a second light pattern portion, wherein the plurality of lights comprises a first section of lights and a second section of lights that correspond to the first and second light pattern portions, respectively, and wherein the controller is configured to direct the first section of lights to display the first light pattern portion corresponding to the first utility flow data and to direct the second section of lights to display the second light pattern portion corresponding to the second utility flow data.

4. The lighting arrangement of claim 3, wherein the first and second light pattern portions are different colors.

5. The lighting arrangement of claim 3, wherein color of the first light pattern portion varies over time when the first utility flow data indicates first utility flow.

6. The lighting arrangement of claim 3, wherein light intensity of the first light pattern portion varies dynamically over time at a variation speed when the first utility flow data indicates first utility flow.

7. The lighting arrangement of claim 6, wherein the variation speed corresponds to an amount of the first utility flow.

8. The lighting arrangement of claim 1, further comprising:
a transparent or translucent body portion, wherein the plurality of lights are coupled to, housed and/or supported by, disposed in, disposed on, or at least partially surrounded by the transparent or translucent body portion.

9. A method for monitoring utility flow, the method comprising the steps of:
measuring first output data from a first utility device and second output data from a second utility device; wherein the first utility device supplies or generates a first utility service, wherein the second utility device supplies or generates a second utility service different than the first utility service;
processing the first output data into first utility flow data and the second output data into second utility flow data;
retrieving the first utility flow data and the second utility flow data by a controller that is in communication with a plurality of lights; and
directing the plurality of lights via the controller to display a light pattern corresponding to the first utility flow data and the second utility flow data;
wherein retrieving the first utility flow data and the second utility flow data includes providing an application programming interface key from the controller to a smart utility platform; wherein the first utility flow data includes a current day utility consumption or generation of the first utility device and a first portion of the light pattern represents a comparison of the current day utility consumption or generation of the first utility device to an estimated average daily consumption or generation of the first utility device; and wherein the second utility flow data includes a current day utility consumption or generation of the second utility device and a second portion of the light pattern further represents a comparison of the current day utility consumption or generation of the second utility device to an estimated average daily consumption or generation of the second utility device.

\* \* \* \* \*